Oct. 15, 1957   D. G. DEDDO   2,809,910
METHOD OF MAKING PREFABRICATED UPHOLSTERY MATERIAL
Filed March 22, 1954
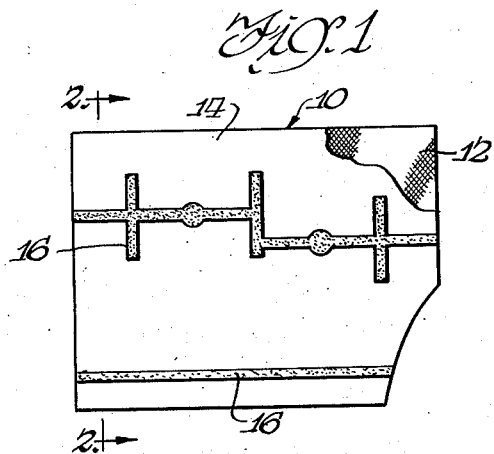
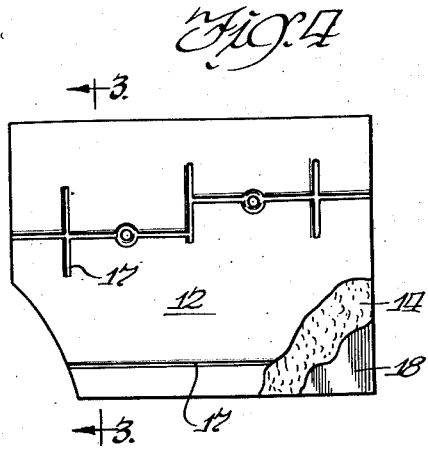
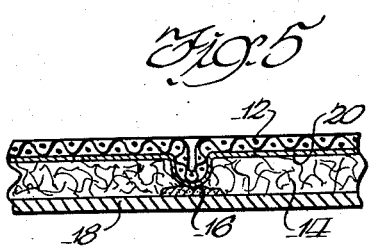
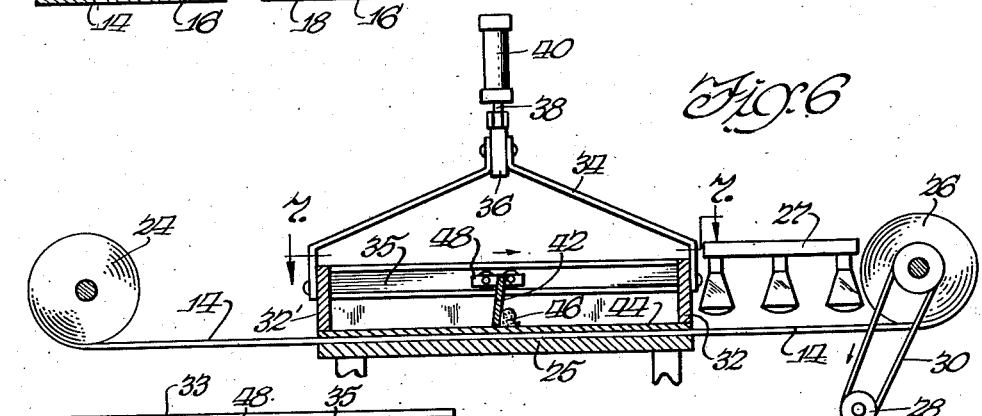
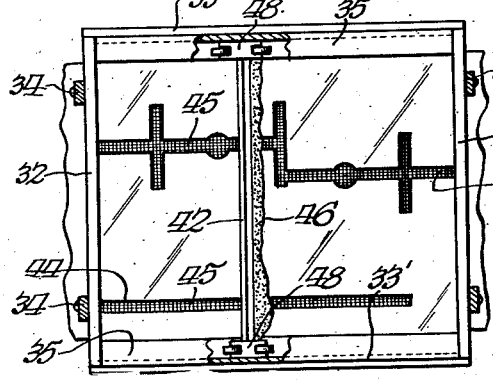
Inventor
Daniel G. Deddo
by Bair, Freeman and Molinare
Attys.

Patent Oct. 15, 1957

2,809,910

METHOD OF MAKING PREFABRICATED UPHOLSTERY MATERIAL

Daniel G. Deddo, Chicago, Ill.

Application March 22, 1954, Serial No. 417,845

4 Claims. (Cl. 154—106)

This invention relates to a novel laminated upholstery material or trim panel and to an improved method for economically and efficiently preparing such material. The upholstery laminate of the invention comprises a relatively stiff base sheet or board, a facing or trim sheet of upholstery material such as leather, fabric, or coated fabric, and a sheet of padding interposed between the base sheet and the facing sheet, all bonded together to provide a unitary composite panel. Such laminated panels find use as interior coverings for automobile doors, trunk linings and seat backs, coverings for walls in homes and commercial buildings and in furnitude. The panels are characterized by good heat and sound insulating properties, light weight and very pleasing appearance, particularly when tufted to produce an inlaid or embossed design in the facing sheet by compressing the padding.

In preparing panels of this kind in accordance with conventional practice, the adhesive for bonding the trim or facing material and the base sheet to the padding is provided in the form of an absorbent paper sheet completely saturated with a dried heat sensitive adhesive, for example, a phenol formaldehyde resin deposited from a solution. This adhesive carrier paper is cemented to the padding with any suitable adhesive such as a rubber cement and then die cut to the size and shape of the final panel. The die cut padding with adhesive carrier sheet bonded thereto is plied up with a base sheet and a facing sheet which have been previously cut to desired size and shape. The padding is placed with the adhesive carrier sheet adjacent the base sheet. This laminate is then subjected to heat and pressure in any suitable apparatus to activate the heat sensitive adhesive in the carrier sheet, causing it to strike completely through the padding to bond the padding to the base sheet on one side and the facing sheet on the other. Usually the pressure is applied to particular areas so that the padding is compressed in these areas to form an embossed design as well as to bond the several plies together. If the facing sheet is a fabric that may be soiled by contact with the adhesive, or the asphalt impregnant used in some types of base boards, it is customary practice to place a thin film of thermoplastic resinous material, for example, vinyl resin, between the padding and the fabric facing. Upon application of heat and pressure the vinyl resin is softened simultaneously with the adhesive and fuses to the fabric facing on one side and the padding on the other. The resin film prevents penetration of the fabric by the adhesive that strikes through the padding.

The process described is wasteful in that, (1) the adhesive extends over the entire area of the panel, whereas it is required only in the limited areas where heat and pressure are applied, and (2) the scrap remaining after die cutting the laminated padding and adhesive carrier sheet cannot be separated for practical salvage.

It is an object of the present invention to eliminate the waste inherent in the prior method of preparing the padding-adhesive laminates; to reduce markedly the amount of adhesive required to bond the individual layers together; to provide a prefabricated detachably assembled laminate of padding and a facing sheet of upholstery material; and to provide a novel method for accurately applying adhesive to preselected areas of sheet material.

These and other objects will become apparent from the following description and from the appended claims. In the accompanying drawings, which serve to illustrate the invention:

Figure 1 is a plan view, partly broken away, of a composite sheet of padding and facing sheet prepared in accordance with my invention.

Figure 2 is a cross-sectional view taken along the line 2—2 of Figure 1.

Figure 3 is a cross-sectional view taken along the line 3—3 of Figure 4.

Figure 4 is a plan view of a completed laminated panel prepared in accordance with the invention.

Figure 5 is a cross-sectional view of a modification of the construction shown in Figure 3 in which the facing material is a textile fabric backed by a thin film of plastic sheet material.

Figure 6 is a diagrammatic elevational view, partly in section, of suitable apparatus for accurately applying the adhesive in accordance with the invention.

Figure 7 is a cross-sectional view taken along the line 7—7 of Figure 6.

The padding material 14 shown in Figure 1 is supplied in continuous lengths from rolls and is made from cotton, wool, wood cellulose or other suitable fibers, foam or sponge rubber, kapok, or other substances that can be formed into a soft fluffy absorptive compressible padding. The adhesive which will serve to bond the padding to the facing sheet 12 on one side and to the relatively stiff boardy sheet 18 on the other side may be latex water base adhesive, rubber cement, a phenolic (phenol-aldehyde) resin or urea-formaldehyde resin adhesive, or any similar bonding agent. The adhesive is applied over preselected areas 16 by masking off all other areas of the padding sheet except where the adhesive is to be applied. It is important that the areas be accurately located with respect to the edges of the sheet since these areas must correspond exactly to the die in final pressing operation. Application can be made by means of a stencil, or by using the so-called silk screen process. The adhesive may also be applied simply by brushing without the aid of a mask of any kind. A preferred method and apparatus for coating the padding over limited areas will be described hereinafter.

Because the fibrous padding has absorptive properties, the adhesive 16 may be absorbed by the padding so that it penetrates partly through the thickness of the padding to saturate or partially impregnate the padding as shown in Figure 2. The degree of penetration will depend upon the viscosity of the adhesive, the absorptive properties of the padding, and the amount of adhesive applied. A low-viscosity adhesive applied in a heavy coat will penetrate an absorptive padding rather thoroughly, while a thin coat of viscous adhesive will penetrate hardly at all. The padding, in a continuous web, having adhesive applied to one side as indicated, is then detachably secured to a web of the facing sheet 12 by means of spot application of adhesive or by means of staples or other suitable temporary fasteners. Then the panels are cut from the assembled sheet 10 which consists of padding 14 and facing sheet 12. Because the padding is not permanently bonded to the facing sheet, the two may be separated with no difficulty, and the scrap remaining after die cutting, salvaged. Neither is the scrap padding contaminated with adhesive, because the adhesive is applied only in the areas within the boundaries of the panel.

A preferred method for applying the adhesive to the padding in accurately located areas is illustrated in Figures 6 and 7. A web of padding 14 supplied from the roll 24 is advanced intermittently over the table or supporting surface 25 and under drying lamps 27 by means of a source of power 28 connected to the wind-up roll 26 through belt 30. The apparatus for applying the adhesive to the web consists of a rectangular frame having opposite parallel sides 32 and 32', and 33 and 33'. Stretched over and secured to the bottom of said frame is a screen 44 woven from polyvinylidene chloride monofilament fibers. The size of the screen is about 16 mesh, the fibers being approximately 0.0025" in diameter. This is a coarse screen as compared with the fine silk screens and similar screens used previously in screen printing processes. The size of the mesh will vary somewhat with the viscosity of the adhesive being used. The material from which the screen is made is critical. All conventional screen materials clog rapidly when viscous adhesives such as phenolic resin adhesives are squeezed through the mesh in the screen printing process. It was highly unexpected that polyvinylidene chloride resin should have little affinity for the adhesives that are commonly used in binding these laminates together. Screens made from these resinous fibers do not plug readily, and may be used for relatively long periods of time in production.

The screen 44 is covered with a stencil 43 over the entire area except for cutout portions 45 which define a design which is to be printed through the screen. The stencil may be made from any conventional stencil material which is impervious to the adhesives and will prevent them from penetrating through the screen. The frame members 33 and 33' have a pair of tracks 35 and 35' secured to the inner faces thereof near the top edges. A doctor blade, or squeegee, 42, extending across the frame, is mounted at its extremities on trucks 48 which are adapted to travel in the tracks from one end of the frame to the other. The lower edge of the squeegee is adapted to scrape the surface of the screen 44. The squeegee is made from wood, Masonite, rubber or other suitable material. Four hanger straps 34 are secured to the end frame members 32 and 32' near the outer ends thereof. The straps extend upwardly and toward each other, terminating at a central laterally-extending bar 36 to which the straps are bolted. Bar 36 is secured to the rod 38 of a hydraulic cylinder 40 which is adapted to move the frame a slight distance above the table 25 to permit the web 14 to pass thereunder. Other means for mounting the screen may be provided, as for example, by hinging the screen frame to the supporting surface 25 along one of the longitudinal edges of members 33 or 33'.

In operation the adhesive 46 is placed over the screen 44 and stencil 43 in a bank behind the squeegee or doctor blade 42. The squeegee is then advanced from one end of the frame to the other to force the adhesive 46 through the openings 44 in the stencil. The adhesive flows through the screen located beneath the cutout areas and is deposited as a coating in the form of a design on the surface of the padding 14. The amount of adhesive deposited may be increased by employing a coarser mesh screen and/or decreasing the viscosity of the adhesive. The hydraulic cylinder is then actuated to lift the screen frame from the surface of the padding, and the padding web advances the distance of one panel length, whereupon the frame is once again lowered into contact with the surface of the padding, and the operation repeated. This apparatus may be operated manually or may be power operated and automatically controlled. The adhesive just applied is dried under lamps 27 while printing of the next section is carried out.

The web passing beneath the screen is accurately aligned with the edges of the screen frame, hence the adhesive is always applied precisely over the selected areas cut in the stencil. The accurate location of the adhesive made possible by this method of application is an important feature of the present method for preparing trim panels. It will be understood that the number of panels printed with adhesive at one time will vary in accordance with their size. Although the example discloses preparation of a single panel, two, four or more small panels may be prepared simultaneously by cutting the stencil to provide for deposit of adhesive over the required areas. The padding may also be printed with adhesive on both sides instead of just one. After severably laminating the adhesive coated padding to the facing sheet the laminated web is advanced under a cutting die which will cut out the individual panels whether it be one, two or more.

The laminated padding 14 and facing sheet 12, which have been die cut to panel size, are then laid up over the self-supporting base board 18 for bonding thereto. This base board may be made from heavy cardboard, asphalt impregnated cellulose board, chipboard or the like. The board 18 has previously been die cut to the panel size and shape. The plied up materials are then placed in a press and subjected to heat and pressure by means of a die having projections conforming to the preselected areas which are to be compressed to form the design. The die projections and the adhesive coated areas are congruent. Upon application of heat and pressure the adhesive 16 softens and flows through the padding to bond the facing sheet 12 securely to the base board 18 through the padding. The padding in the compressed area is completely flattened and impregnated with adhesive as indicated at 17 so that an embossed or tufted effect results. The final panel is shown in Figures 3 and 4. The pressing operation may be completed very rapidly by heating with high frequency electrical energy, which causes the laminate and adhesive to heat through in a matter of seconds.

Figure 5 shows a cross-sectional view of a modification of the construction shown in Figures 3 and 4 wherein the trim or facing sheet 12 has been backed with a sheet of resinous thermoplastic material 20 such as a vinyl resin or polyethylene. The primary purpose of the film 20 is to prevent penetration of the adhesive 16 or asphalt in the board 18 to the fabric facing 12. These thermoplastic resinous films are capable of softening upon application of heat and, therefore, they serve not only to prevent the adhesive 16 from striking through the fabric and soiling it, but they also aid in adhering the fabric to the padding. When heat and pressure are applied, the sheet 20 fuses to the facing sheet 12 on one side and to the compressed padding on the other. Simultaneously, the adhesive 16 is softened, and under the influence of pressure strikes completely through the padding to secure the bonded facing sheets 12 and 20 to the padding, and to secure the padding to the base sheet 18, along the lines 17 where the pressure is applied.

To finish the panel, the edges of the facing sheet 12 are folded over the back of base board 18 and secured thereto in accordance with conventional practice.

From the foregoing description it is apparent that a great saving in the amount of adhesive used for preparing these laminates can be effected, since the adhesive is applied only in the areas where the various plies are to be adhered together. It is also clear that the method for applying the adhesive permits accurate location of the areas of application. Furthermore, the scrap resulting from die cutting the panels is completely reclaimable because it has not been adhesively secured to adhesive-saturated paper, as in the previous practice.

Having described my invention, what I wish to claim is:

1. A method of producing a decorative sound-deadening tufted upholstery laminate which comprises applying a heat sensitive adhesive to one side of a sheet of soft padding over preselected areas thereof, laying said padding over a relatively stiff base sheet with the adhesive in contact with said base sheet, placing a sheet of decorative upholstery material comprising a thermoplastic resin over the other side of said padding to provide a sandwich assembly, subjecting said sandwich to the simultaneous application of heat and pressure over said preselected areas to activate the adhesive, compress the padding, and fuse said thermoplastic resin, thereby producing a unitary structure securely bonded at said preselected areas by the adhesive and fused resin and having depressed portions congruent with said preselected areas to provide a tufted appearance.

2. A method of producing a decorative sound-deadening tufted upholstery laminate which comprises applying a heat sensitive adhesive to one side of a sheet of soft padding over preselected areas thereof, laying said padding over a relatively stiff base sheet with the adhesive in contact with said base sheet, placing a sheet of thermoplastic resinous material over said padding, placing a sheet of decorative upholstery fabric material over said thermoplastic sheet, detachably securing said assembly together in sandwich form to permit handling, subjecting said sandwich to the simultaneous application of heat and pressure over said preselected areas to activate the adhesive, compress the padding, and fuse said thermoplastic resin, thereby producing a unitary structure securely bonded at said preselected areas by the adhesive and fused resin and having depressed portions congruent with said preselected areas to provide a tufted appearance.

3. The method of claim 1 wherein said adhesive is applied through screened openings in a stencil.

4. The method of claim 1 wherein said adhesive comprises a phenol-aldehyde resin.

References Cited in the file of this patent

UNITED STATES PATENTS

| | | |
|---|---|---|
| 1,433,203 | Halpern | Oct. 24, 1922 |
| 2,166,435 | Haberstump | July 18, 1939 |
| 2,264,628 | Engert et al. | Dec. 2, 1941 |
| 2,287,159 | Zinser | June 23, 1942 |
| 2,322,226 | Cunnington | June 22, 1943 |
| 2,369,658 | Burns | Feb. 20, 1945 |
| 2,578,709 | Lyijynen | Dec. 18, 1951 |